United States Patent [19]

Saladin

[11] 4,341,475
[45] Jul. 27, 1982

[54] APPARATUS FOR DRIVING A RIGID BODY FOR THE PURPOSES OF PRODUCING A TUMBLING MOVEMENT DURING ROTATION OF THE BODY

[75] Inventor: Josef Saladin, Wil, Switzerland
[73] Assignee: Bürgel AG, Basel, Switzerland
[21] Appl. No.: 201,405
[22] PCT Filed: Feb. 26, 1980
[86] PCT No.: PCT/CH80/00027
 § 371 Date: Oct. 30, 1980
 § 102(e) Date: Oct. 30, 1980
[87] PCT Pub. No.: WO80/01830
 PCT Pub. Date: Sep. 4, 1980

[30] Foreign Application Priority Data
 Mar. 1, 1979 [CH] Switzerland ............... 1993/79

[51] Int. Cl.³ .................. B01F 11/00; F16H 21/46
[52] U.S. Cl. ........................... 366/211; 464/66
[58] Field of Search ............... 366/101, 107, 167, 173, 366/177, 180, 208–212, 213, 214, 216, 217, 219, 220, 237, 239; 185/37, 39; 74/96; 64/27 R, 27 C, 27 CT; 248/182

[56] References Cited

U.S. PATENT DOCUMENTS 2,302,804 11/1942 Schatz ........................... 366/209
3,487,706 1/1970 Resener ......................... 64/27 C
3,952,545 4/1976 Koeslin ......................... 64/27 C

FOREIGN PATENT DOCUMENTS 1145455 3/1963 Fed. Rep. of Germany .
1207750 12/1965 Fed. Rep. of Germany .
2181375 11/1973 France .
586066 3/1977 Switzerland .

Primary Examiner—Philip R. Coe
Assistant Examiner—Timothy F. Simone
Attorney, Agent, or Firm—Watson, Cole, Grindle & Watson

[57] ABSTRACT

A body (1) serving for accommodating material to be processed is movable in gimbal suspensions (35–40) around two mutually spaced axes (39,40) extending in different directions. The body (1) carries out a rotary and tumbling movement by oppositely rotating two parallel shafts (21,22) of which each is connected with one of the gimbal suspensions. For balancing torque fluctuations, a pair of discs (26,27) is arranged on each shaft (21,22) of which the driving-side disc (26) is rotatable relative to the shaft and is connected with a drive wheel (23) while the driven-side disc (27) is fixedly connected with a shaft. In an annular channel (262,272) between the discs (26,27) energy stores in the form of coil compression springs (53) and balls (52) are alternatingly and successively arranged. These elements bear against respective abutments of both discs projecting into the channel. When the discs (26,27) rotate relative to each other, the springs (53) store forces arising at torque excesses which are then subsequently released.

15 Claims, 8 Drawing Figures

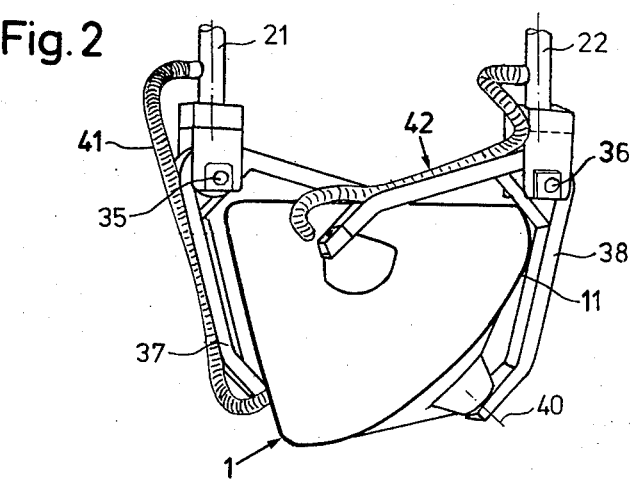
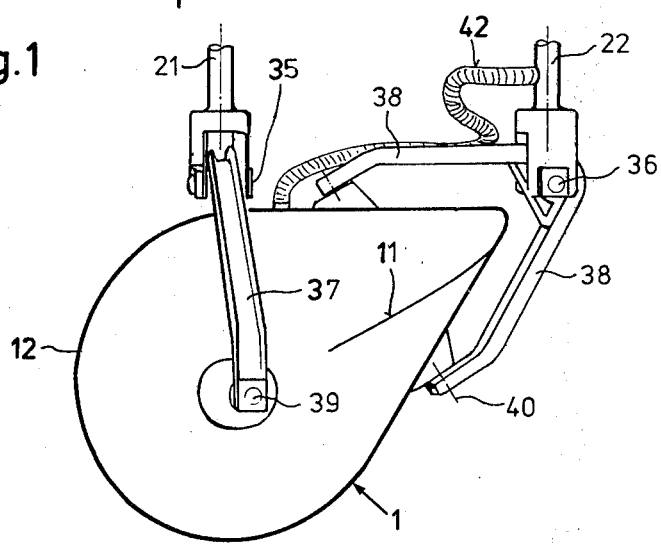
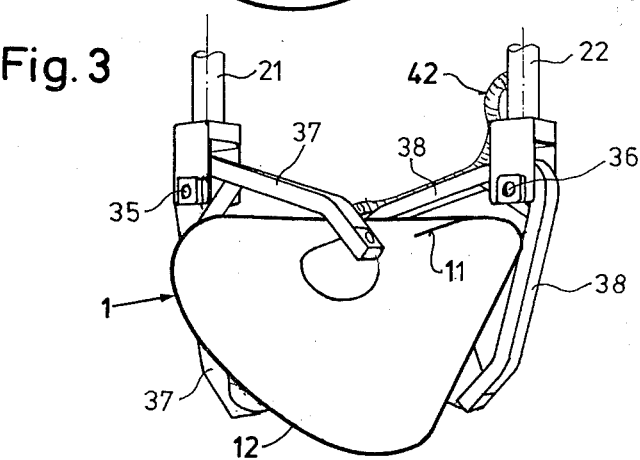

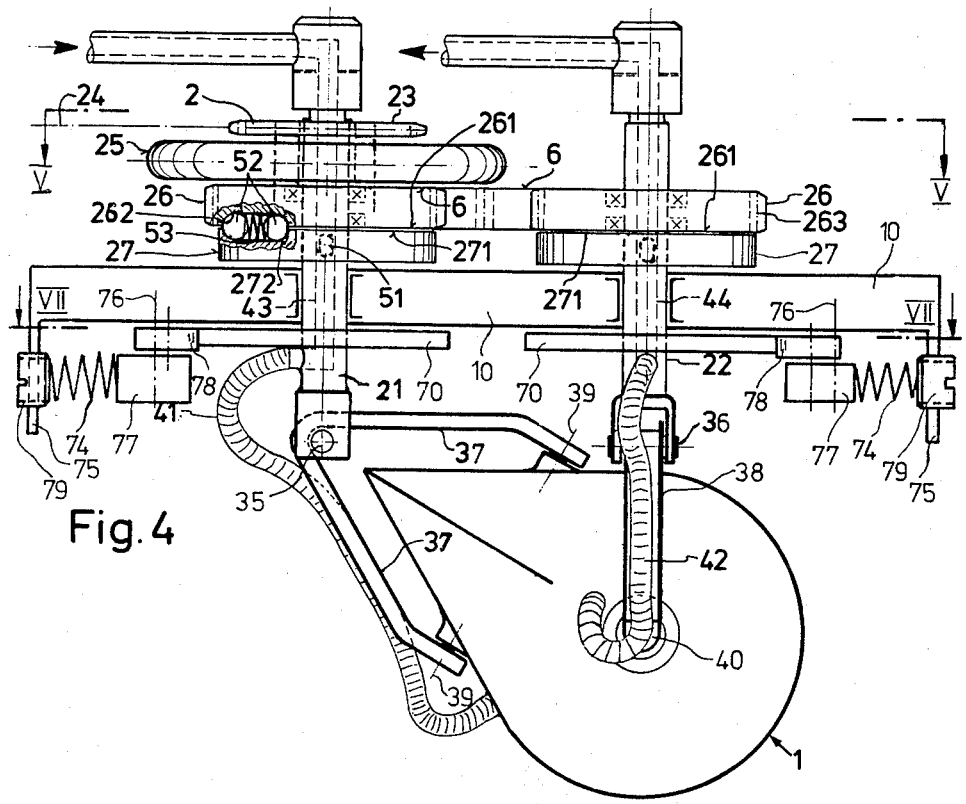
Fig. 4
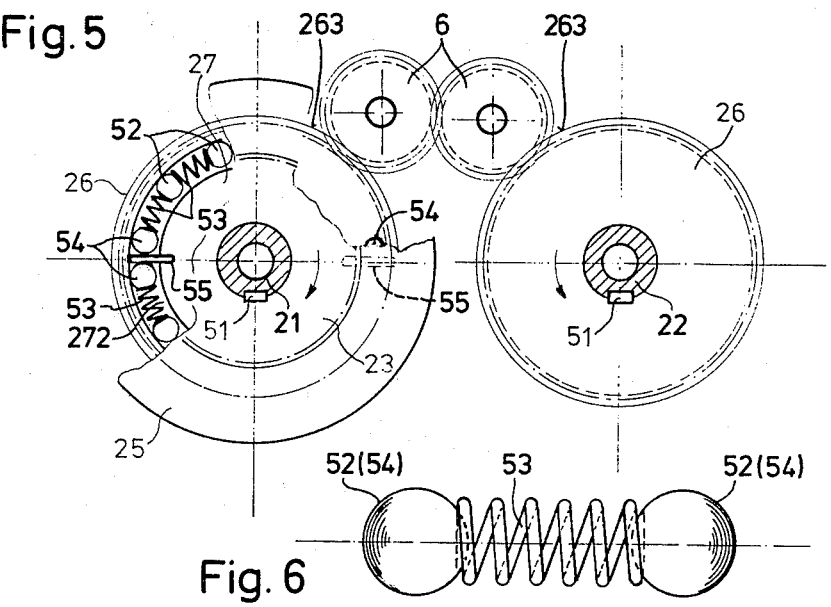
Fig. 5
Fig. 6

APPARATUS FOR DRIVING A RIGID BODY FOR THE PURPOSES OF PRODUCING A TUMBLING MOVEMENT DURING ROTATION OF THE BODY

BACKGROUND OF THE INVENTION

The invention concerns a process for driving a rigid body which, for producing tumbling movements in gimbal suspensions is displaceable about two mutually spaced axes directed in different directions and which is drivable by a drive means and a transmission between the drive means and the gimbal suspensions, whereby the body performs a non-uniform rotary movement with periodic wobbles during the tumbling movement.

The body serves particularly as a hollow body for receiving goods to be processed which are to be subjected to physical or chemical processes, whereby because of the simultaneous tumbling and rotary movements particularly favourable effects are achieved with regard to the course of such processes.

During simultaneous tumbling and rotary movements of a hollow body more or less filled with goods to be treated, inertial forces arise which do not permit the drive to be achieved by means of simple transmission means. Additionally, when the body rotates around two mutually spaced skew axes, in the mutually oppositely rotating driving elements carrying the gimbal suspensions differing angular velocities arise which are exerted in a periodically alternating manner from the side of the body on these driving elements because of the kinematics of the arrangement, which may be regarded as a swivel-joint. For these reasons it is not advisable to utilise positively connected transmission means for driving the body. Since however, on the other hand, the effects of spatial three-dimensionally directed longitudinal and rotary movements arising through the suspension of the body on the goods to be processed in the body have proved to be particularly favourable in relation to the course of physical and chemical processes, and the achievement of homogeneous mixtures, etc., the task is to provide a drive with which the above-mentioned problems may be solved and in which the non-uniformities of motion due to the kinematics and the inertial forces are compensated or balanced to such an extent that sufficiently high r.p.m. is achievable to satisfy the economic installation of such machine. Furthermore it is important to provide a construction of the machine which makes it possible for the material to be processed within the body to be subjected to the specific process in a continuous process rather than in a batch-wise manner.

To solve the above-mentioned tasks, the process described above is characterised according to the invention in that in order to balance torque fluctuations caused by the difference in angular velocities at the driving side and driven side of the transmission and by inertial forces, torque is periodically alternatingly stored in torque-transmitting members of the said transmission and returned to the latter. In this way suitable transmission forces caused by excess of torque are passed into a resiliently yielding energy store and during periods of shortfall, the stored energy or forces are passed back from the energy stores into the transmission. During periods of an excess of torque, an oppositely directed torque is produced and passed back into the transmission, and on the other hand during periods of torque shortfall, an additional equidirectional torque is produced and passed back into the transmission. Finally, in an expedient manner, periodically torque may be removed from the transmission, stored and then passed back into the transmission.

The invention also concerns apparatus for carrying out the process. The apparatus comprises a body which, for producing tumbling movements in gimbal suspensions, is displaceable about two mutually spaced axes directed in different directions and which includes a drive means as well as transmission means between the drive means and rotatably journalled shafts with which latter a respective one of the gimbal suspensions for the body is connected. The apparatus is according to the invention characterised in that the transmission means include torque transmitting members one of which is operatively connected with the drive means and another of which is operatively connected with a shaft carrying the gimbal suspension and that resiliently yielding energy stores are arranged between the torque-transmitting members for the periodical alternating storing and releasing of forces (energy). Preferably, the torque-transmitting members include two mutually coaxially arranged discs of a shaft coupling, the end surfaces of the discs facing each other being provided with annular recesses which together form a closed annular channel in which are arranged rolling elements and the energy stores in the form of coil compression springs arranged alternatingly and successively with the rolling elements in the circumferential direction, and that at least one abutment is arranged at each of the discs which abutment project(s) into the annular channel and form(s) a support for the energy stores. Both of the discs constituting the torque-transmitting members may be arranged on one shaft with which the disc on the driven side is connected rigidly for rotation, while the disc on the driving side is connected rigidly for rotation with a driving wheel, for example a gear wheel or a sprocket wheel, and the disc on the driving side and the driving wheel are arranged on the shaft so as to be rotatable relative thereto.

In this way the two discs may rotate relative to each other about a predetermined angle whereby the energy stores in the form of coil compression springs are pressed together when a torque excess arises so as to store torque in this way, which then during a succeeding period of torque shortfall may be released again.

Expediently, the transmission means for each of the shafts connected with the gimbal suspension are formed identically with each other and the drive of the two shafts through which or by means of which rotation of the body in a tumbling and rotary movement is carried out ensues so that the discs on the driving side are coupled to a respective shaft carrying a respective gimbal suspension via a non-slip movement transmission, for instance in such a way that both driving side discs are peripherally toothed. Then, the energy stores in the form of coil compression springs, together with the rolling elements between the individual springs, are arranged on the two shafts respectively between one of the driving-side discs and one of the driven-side discs.

As an additional measure, periodically torque may be removed from the transmission, stored and then passed back into the transmission.

To this end, a cam disc is in operative connection with at least one of these shafts, preferably with both shafts, the peripheral surface of each disc having sections with differing radial spacing from the axis of rotation, wherein sections with greater and smaller spacing alternate successively in a peripheral direction, and that the peripheral surface of each cam disc co-operates with a further energy store, for example also in the form of a coil compression spring, which energy store is stationarily supported in the frame of the machine and exerts a pressure force against the peripheral surface of the cam disc whereby torque is exerted via the cam disc on the shafts. Expediently, the spring does not press directly against the cam disc but rather against a pivotally journalled lever with a rolling element journalled at the end of the lever which rolls on the peripheral surface of the cam disc. With the aid of this additional energy store, the degree of uniformity of the movement of the rotating body may be significantly increased.

Other means may also be used as energy stores, and particularly the storage of mechanical, hydraulic, pneumatic, magnetic, electrodynamic and other storable forces come into reckoning. However, in the preferred embodiment of compression springs arranged between the discs of a shaft coupling the advantage arises that the discs also have the function or role of inertial masses or may be integrated with such masses, while in any other constructional solution, additional space would be required for a flywheel. Furthermore, as an additional advantage, the shafts carrying the discs may be formed as hollow shafts so that the goods being processed may be passed through the hollow shafts into the interior of the body in a continuous process and then passed back from there.

The body carrying out tumbling and rotary movements serves not only for the already mentioned performing of physical or chemical processes on the goods to be processed contained in its hollow interior, but rather it displays its particular effects also on goods to be processed surrounding the body and is in this way suitable for very many cases of application.

Other advantages and details of the invention will become clear from the following description and drawings, which illustrate a preferred embodiment of the invention.

DESCRIPTION OF THE DRAWINGS

In the drawings,

FIG. 1 is a view of the tumbling body with the lower part of the two driving shafts lying in the plane of the drawing, in the first position of the rotation of the tumbling body;

FIGS. 2 and 3 shows views similar to FIG. 1 but respectively showing the tumbling body in a different position of rotation;

FIG. 4 shows a side view of the driving apparatus for the tumbling body;

FIG. 5 shows a plan view of the driving apparatus taken along the line V—V of FIG. 4, partially in section and on an enlarged scale;

FIG. 6 shows an energy store in the form of a coil compression spring arranged between balls, on an enlarged scale;

DETAILED DESCRIPTION OF THE PREFERRED EMBODIMENTS

Figure 7:
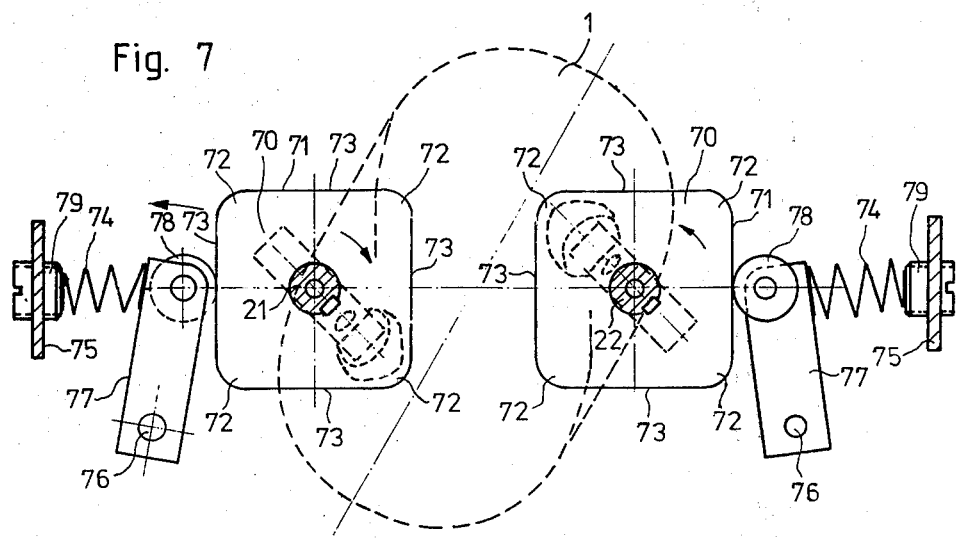
FIG. 7 shows a plan view of cam discs connected with the driving shafts and of additional energy stores co-operating with the cam discs, representing a detail view taken along the line VII—VII in FIG. 4.

The body 1 shown in FIGS. 1-3 in different positions of rotation is a standard body of specific form, which provides particularly favourable results with regard to the effects achievable on goods to be treated through simultaneous tumbling and rotating movements. The standard body 1 has two convex edges 11 and 12 which have the same radius of curvature and lie in two planes which are at right angles to each other, the enveloping surface having straight surface lines between these edges. The body carries out a simultaneous rotary movement and tumble movement by rotation about two mutually spaced axes 39 and 40 which are directed in different directions, that is to say, which are skew. The axes 39 and 40 extend at all times through the centre-point of curvature of the edges 11 and 12 and normally to the two planes in which these edges lie.

The body 1 is retained on a first shaft 21 the end of which is formed as a fork and carries a pivot pin 35, the body being held by a supporting stirrup 37 pivotally mounted on the pivot pin 35 and having at its end a rotary pin constituting the axis 39 on which the body is secured. Furthermore, the body 1 is also held on a shaft 22 extending parallel to the shaft 21 by way of a supporting stirrup 38 journalled in a pivot pin 36 the end of the stirrup having a rotary pin forming the axis 40. By means of the gimbal suspensions providing the body with freedoms of movement about the mutually perpendicular axes 35 and 39, on the one hand, and the mutually perpendicular axes 36 and 40, on the other hand, the body 1 performs a tumbling and rotary movement when the two shafts 21 and 22 are rotated in opposite directions. From FIGS. 2 and 3 it may be seen how the body 1 alters its position in the course of the tumbling movement.

The shafts 21 and 22 are formed as hollow shafts and are connected above their fork-shaped ends with flexible ducts 41 and 42 which open into the body 1 at two different positions and serve for the supply of the goods to be treated and for their removal. These ducts must be so flexible as to ensure that they do not impede the tumbling rotary movement of the body.

FIG. 4 shows in side view the drive means for the body 1. In a machine frame 10 the two mutually parallel shafts 21 and 22 are rotatably journalled, the shafts carrying the body 1 via the gimbal suspensions. A sprocket wheel 23 is journalled on the shaft 21 for rotation relative thereto, i.e., it can rotate in both angular directions relative to the shafts. A chain entrained around the sprocket 23 is driven by a motor which is not illustrated in the drawing. A disc-shaped flywheel 25 is disposed on the shaft underneath the sprocket 23 and is journalled for rotation relative to the shaft. It is rigidly connected with the sprocket. Furthermore, a disc 26 is rigidly connected with the flywheel 25 which disc is also mounted on the shaft for rotation relative thereto. Underneath the disc 26 is a further disc 27 which is fixed by means of a wedge 51 (FIG. 5) on the shaft 21 for rotation therewith. On its lower end face 261 the disc 26 has an annular groove-shaped recess 262 and on its upper end face 271 the disc 27 has an annular groove-shaped recess 272. These two recesses complement each other to form an annular channel in which circumferentially alternatingly and successively are arranged balls 52 and 54 and coil compression springs 53 which form energy stores (FIG. 5). An abutment 55 is arranged at each of the two discs 26 and 27 and projects into the annular channel. The last balls 54 of the semicircular series of balls and springs abut against this abutment 55. When the abutment in FIG. 5 shown on the left-hand side is arranged rigidly in the lower disc 27 while the abutment 55 illustrated on the right-hand side is rigidly mounted in the upper disc 26, then on the rotating the disc 26 along the direction indicated by the arrow in a clockwise direction, an excess of torque on the driving side is stored in the compression springs 53 lying on the lower semicircle, while the springs on the upper semicircle are unloaded or receive greater play if they are not prestressed. The mode of operation is the same when a torque arises in the opposite direction, the only difference being that the compression springs disposed in the other half of the annular channel come into action for storing the torque. It makes no difference whether such a torque arises from the driving side or the driven side. Thus, the body 1 will take up the torque caused by the inertial forces aroused by the tumble movement in an energy-storing and thus damped manner, so that the driving-side transmission means operate quietly and in a shock-free manner.

Since the two shafts 21 and 22 must rotate in opposite directions, the two discs 26 on which the two shafts 21 and 22 are arranged are provided at their periphery with toothing 263. The two discs 26 are coupled via a non-slip movement transmission via two pinions 6 (FIG. 5) which mesh with the teeth 263 of the discs 26. In other respects, the construction of the disc 26 and the disc 27 arranged beneath the latter with the energy stores and balls arranged within the two discs are the same for the shaft 22 as for the previously described discs 26 and 27 on the shafts 21.

Figure 8:
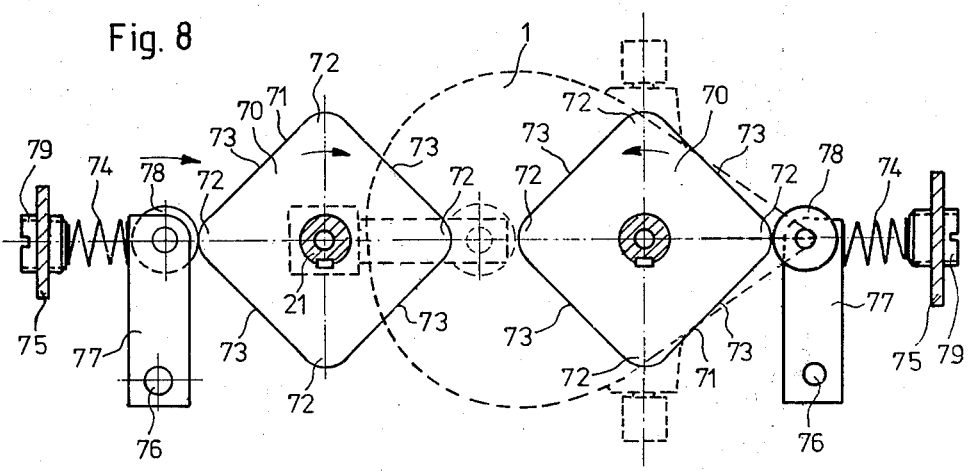
FIG. 8 shows a plan view of the cam discs in FIG. 7 taken in a different rotary position.

FIG. 7 shows a detail of the apparatus according to FIG. 4 taken on a plan view along the line VII—VII. A respective cam disc 70 is secured against relative rotation on the two shafts 21 and 22. The peripheral surface of each cam disc has sections 72 which are at a greater radial spacing from the axis of rotation than further sections 73 which are at a smaller radial spacing from the axis of rotation. An energy store 74 in the form of a coil compression spring has one of its ends bearing against a positionally fixed part 75 of the machine frame and its other end presses against a lever 77 pivotable about a positionally fixed axis 76. One end of this lever 77 carries a rotatably journalled rolling element 78 which rolls on the peripheral surface 71 of the cam disc 70 when the cam disc 70 rotates with the shaft. In FIG. 8 another position of rotation of the cam disc is shown and it may be seen that on rotation of the cam disc the spring 74 is alternately compressed and relaxed. In this way, the spring force periodically exerts a torque on the shaft 21 or 22 by way of the cam disc whenever the cam disc 70 with its section 72 of greater radial spacing passes by the rolling element 78. This spring 74 stores energy when the said section approaches the rolling element 78 in the course of rotation of the cam disc and a torque is exerted on the lever 77. This alternating play is repeated four times during a complete rotation of the shaft 21 or 22. In FIGS. 7 and 8, broken lines indicate the position of the body in the associated position of the cam disc. The force of the spring 74 may be adjusted in a variable manner by means of an adjusting screw 79. In deviation from the drawing, the cam disc 70 may be arranged directly under the discs 27 and may be secured against rotation with the disc, or the cam disc may preferably form a single component with the disc 27.

With the aid of this additional energy store 74, the fluctuations of torque and the vibrations resulting therefrom arising in spite of the energy stores 53 present between the two discs 26 and 27 may be at least approximately, or completely, eliminated by this counterforce so that the desired uniformity of movement is achieved. In certain cases of application, with lower shaft r.p.m. and smaller mass of the body 1 the additional energy stores and cam discs may be dispensed with.

As will be manifest from FIGS. 4–8 the shafts 21 and 22 are formed as hollow shafts so that the goods to be treated may be supplied to the body and removed from there along channels 43 and 44 extending along the length of their axes and over the flexible ducts 41 and 42. Furthermore, it is also possible to form the supporting arms 37 and 38 as hollow bodies whereby the goods to be processed may be passed into the body 1 or removed therefrom via hollow links in the gimbal suspensions. Still further, a plurality of bodies 1 may be connected together in a battery of such bodies, in series or in parallel connection, in order to treat the goods in stages or in order to achieve a greater throughput per unit of time in parallel operation.

With the aid of the body 1 of the above-described type, which during its rotary movement also carries out a tumbling movement and thereby subjects the goods to be treated in the body in three-dimensional longitudinal and rotary movements, physical or chemical processes or mixing of different components of the goods to be processed may be carried out with surprising results in many cases. Thus, for instance, it has been found that gas contained in or taken up by liquid or solid treatment material is liberated in opposition to all surface forces when the hollow interior of the body is connected with the atmosphere or with spaces of reduced or superatmospheric pressure. It has also been found in reverse that a gas-free or vapour-free material to be treated takes up gases or vapours to an unexpectedly large extent when the material to be treated is handled in such a body and comes into contact with the media to be taken up, or absorbed. The body with its hollow area may also be used as a means for influencing biological or micro-biological processes wherein a bacterial growth may be influenced. Stated generally, by using the body, an increase in the content of the material to be taken up by the treatment material is just as advantageous, e.g. in the case of taking up disinfectants, cosmetics, medicaments etc. as the reduction in the content of materials such as, for instance, health-damaging contaminants. Furthermore, the tumbling and rotating body may advantageously be used to significantly increase the dispersion efficiency in the take-up of solid materials in gases, vapours or liquids. Furthermore, mixing of liquids may be achieved which otherwise cannot be mixed without further measures. The same is true also for dissolving fluids in other fluids or solid materials when under different conditions no further dissolution is possible. Thus the body with its specific kind of tumbling movement serves for homogenizing, emulsifying, equalising, for the introduction of carbon crystals (diamond powder or splinters) in all kinds of binders such as ceramic carriers, as well as for the introduction of silver halides into gelatine for the manufacture of films of the highest sensitivity, such as X-ray films. Important applications for the pharmaceutical industry are the production of mixtures, in medicine for investigations of urine, blood, etc., in metallurgy for the production of metallic sinter powders, in the cosmetics industry for the manufacture of powders and varnishes, in the food industry the production of all kinds of powder mixtures and in many other areas, where the introduction of the body moved in the specific manner makes it possible to achieve effects which have hitherto not been accomplishable.

Thus the above-described apparatus may also be used for instance in connection with electrolytic processes, be it for the mechanical pretreatment of the electrolyte in the body 1 before electrolysis or be it the use of the body 1 itself as an electrolytic cell.

I claim:

1. Apparatus for producing a tumbling rotary movement comprising a body which, for producing tumbling movements in gimbal suspensions, is displaceable about two mutually spaced axes directed in different directions and which includes a drive means and a transmission means between the drive means and rotatably journalled shafts with which latter a respective one of the gimbal suspensions for the body is connected, characterised in that the transmission means include torque-transmitting members one of which is operatively connected with the drive means and another of which is operatively connected with a shaft carrying the gimbal suspension and that resiliently yielding energy stores are arranged between the torque-transmitting members for the periodical alternating storing and releasing of energy forces.

2. Apparatus according to claim 1, characterised in that each of the gimbal suspensions is arranged at a respective shaft and that the transmissions for the respective shafts connected to the gimbal suspensions are formed identically with each other.

3. Apparatus according to claim 1, characterised in that the torque-transmitting member includes two coaxially arranged discs of a shaft coupling, the end surfaces of the discs facing each other being provided with annular recesses which together form a closed annular channel in which are arranged rolling elements and the energy stores in the form of coil compression springs arranged alternatingly and successively with the rolling elements in a circumferential direction, and that at least one abutment is arranged at each of the discs which abutment projects into the annular channel and forms a support for the energy stores.

4. Apparatus according to claim 3, characterised in that a respective rigid abutment is arranged in the annular recess of one of the discs and, at an offset of 180°, in the annular recess of the other disc, the rolling elements bearing against these abutments in one or the other of the opposed directions of rotation of the discs which are rotatable relative to each other.

5. Apparatus according to claim 3, characterised in that the disc on the driving side is formed as a centrifugal or inertial mass or is connected with an additional disc formed as a centrifugal or inertial mass.

6. Apparatus according to claim 3, characterised in that two discs constituting the torque-transmitting members are arranged on one shaft with which the disc on the driven side is connected rigidly for rotation therewith, while the disc on the driving side is connected rigidly for rotation with a driving wheel, for example a gear wheel or a sprocket wheel, and the disc on the driving side and the driving wheel are arranged on the shaft so as to be rotatable relatively thereto.

7. Apparatus according claim 6, characterised in that the discs on the driving side are coupled to a respective shaft carrying a respective gimbal suspension via a non-slip movement transmission.

8. Apparatus according to claim 7, characterised in that the disc on the driving side on the first shaft has peripheral toothing and drives in the opposite angular sense the disc on the driving side on the second shaft which is also peripherally toothed.

9. Apparatus according to claim 8, characterised in that the two gimbal suspensions are secured at the ends of the two oppositely rotatable shafts by way of pivotal axes which extend perpendicularly to each other.

10. Apparatus according to claim 1, characterised in that the shafts are formed as hollow shafts containing supply and discharge channels for the material to be treated, and that the body carrying out the tumbling and rotary movements is a hollow body the interior of which is in communication with the channels in the hollow shafts by way of flexible ducts.

11. Apparatus according to claim 1, characterised in that a cam disc is in operative connection with at least one of the shafts, the peripheral surface of the disc having sections with differing radial spacing from the axis of rotation, whereby sections with greater and smaller spacing alternate successively in a peripheral direction, and that the peripheral surface of the cam disc co-operates with a further energy store, for example in the form of a coil compression spring, which energy store is stationarily supported in the frame of the machine and exerts a pressure force against the peripheral surface of the cam disc whereby torque is exerted via the cam disc on the shafts.

12. Apparatus according to claim 1, characterised in that each of the two shafts is in operative connection with a cam disc and each cam disc co-operates with an energy store.

13. Apparatus according to claim 1, characterised in that the energy store presses against a lever pivotable about a fixedly journalled axis, the end of the lever carrying a rolling element which bears against the peripheral surface of the cam disc.

14. Apparatus according to claim 1, characterised in that the pressure force of the energy store, for instance of the coil compression spring, is variably adjustable, e.g. by means of an adjusting screw, at the positionally fixed support.

15. Apparatus according to claim 1, characterised in that the cam disc is secured on and for rotation with the shaft at a location adjacent to the driven-side disc connected rigidly for rotation with the shaft or is rigidly connected with the said disc or is formed of one piece with the latter.

* * * * *